US011387049B2

(12) United States Patent
Baniecki et al.

(10) Patent No.: US 11,387,049 B2
(45) Date of Patent: Jul. 12, 2022

(54) OXYGEN GENERATING ELECTRODE, OXYGEN GENERATING ELECTRODE DEVICE, AND PHOTOELECTRIC CONVERTER

(71) Applicant: FUJITSU LIMITED, Kawasaki (JP)

(72) Inventors: John David Baniecki, Zama (JP); Hiroyuki Aso, Atsugi (JP); Yoshihiko Imanaka, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 287 days.

(21) Appl. No.: 16/590,677

(22) Filed: Oct. 2, 2019

(65) Prior Publication Data

US 2020/0111619 A1 Apr. 9, 2020

(30) Foreign Application Priority Data

Oct. 5, 2018 (JP) .............................. JP2018-190287

(51) Int. Cl.
*H01G 9/20* (2006.01)

(52) U.S. Cl.
CPC ........... *H01G 9/2027* (2013.01); *H01G 9/209* (2013.01); *H01G 9/2045* (2013.01)

(58) Field of Classification Search
CPC ...... H01G 9/2027; H01G 9/2045; C25B 1/04; C25B 1/55
See application file for complete search history.

(56) References Cited

U.S. PATENT DOCUMENTS

| 2012/0298924 A1 | 11/2012 | Banerjee et al. |
| 2017/0033246 A1* | 2/2017 | Lee ........................ H01L 31/036 |
| 2017/0213653 A1* | 7/2017 | Baniecki ................... C25B 1/55 |

FOREIGN PATENT DOCUMENTS

| EP | 2545992 A1 | 1/2013 |
| JP | 2011-206766 A | 10/2011 |
| JP | 2012-248845 A | 12/2012 |
| JP | 2017-130634 A | 7/2017 |

OTHER PUBLICATIONS

Yuan, et al. Applied Physics Letters, 2007, 91, 094107 (Year: 2007).*
Weston, et al. Physical Review B, 2018, 97, 054112 (Year: 2018).*
Chen, et al. International Journal of Photoenergy, 2014, article 643532 (Year: 2014).*
A De Vos, "Detailed balance limit of the efficiency of tandem solar cells", Journal of Physics D:Applied Physics, vol. 13, pp. 839-846, May 14, 1980, cited in Specification.

* cited by examiner

*Primary Examiner* — Sadie White
(74) *Attorney, Agent, or Firm* — WHDA, LLP

(57) ABSTRACT

An oxygen generating electrode includes a conductive layer; a photocatalyst layer; and a light absorption. The light-absorbing layer arranged between the conductive layer and the photocatalyst layer. The light-absorbing layer is formed of one or a plurality of perovskite-type films, and each of the films contains tin (Sn), oxygen (O), sulfur (S), and one or more elements selected from Group 1 or Group 2 of the periodic table of elements. Each of the films formed by doping S for substituting an O site is set so that a band gap takes a predetermined value in a range between 0 eV to 4 eV.

17 Claims, 16 Drawing Sheets

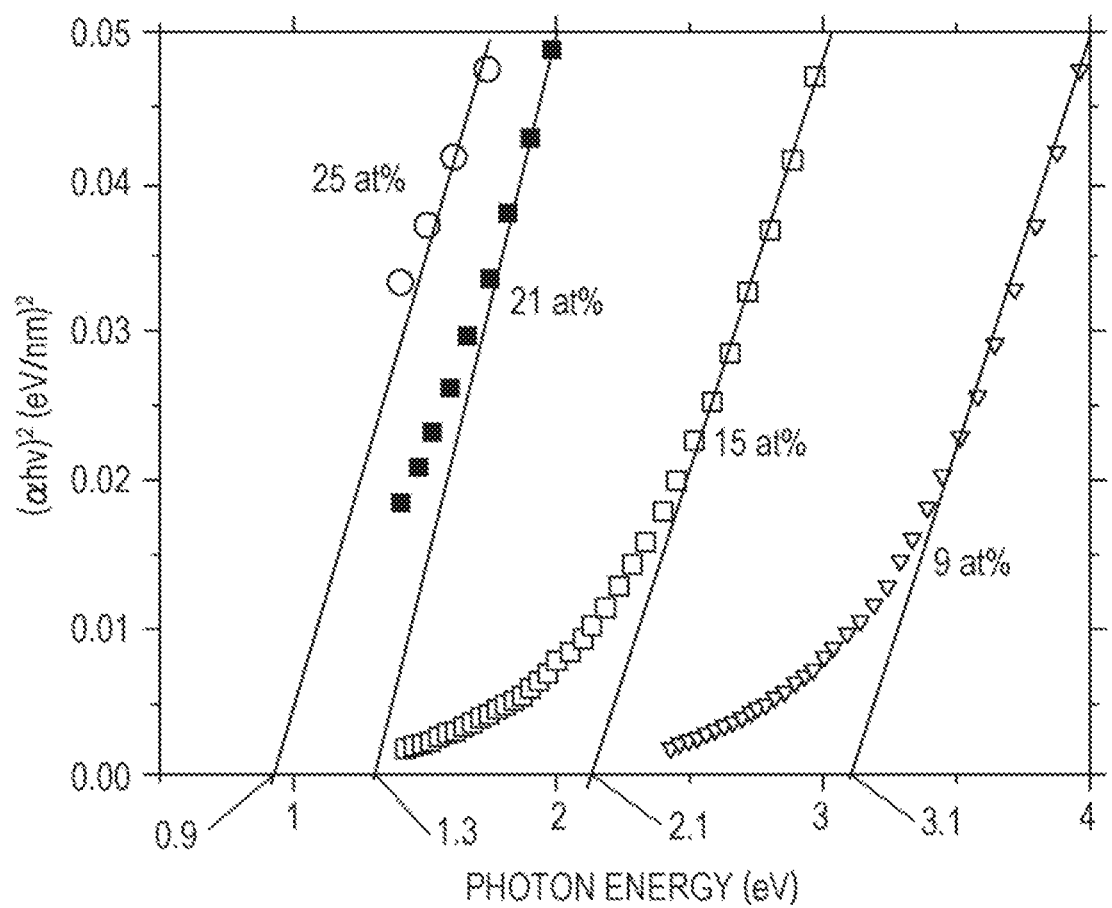

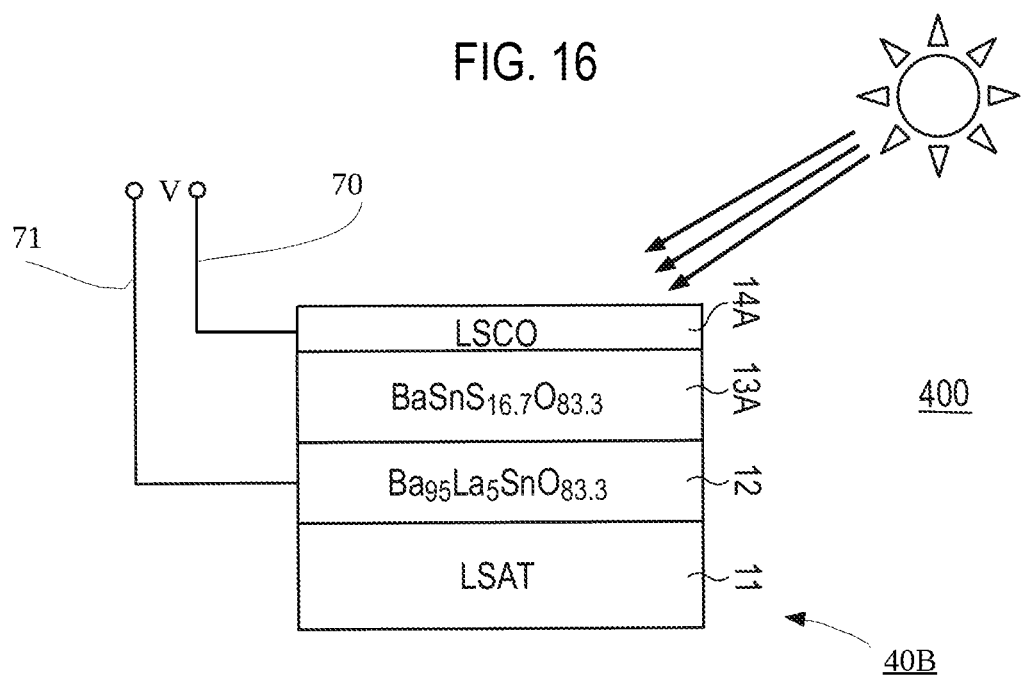

OXYGEN GENERATING ELECTRODE, OXYGEN GENERATING ELECTRODE DEVICE, AND PHOTOELECTRIC CONVERTER

CROSS-REFERENCE TO RELATED APPLICATION

This application is based upon and claims the benefit of priority of the prior Japanese Patent Application No. 2018-190287, filed on Oct. 5, 2018, the entire contents of which are incorporated herein by reference.

FIELD

The embodiments discussed herein are related to an oxygen generating electrode, oxygen generating device, and a photoelectric converter.

BACKGROUND

Currently, a global interest in developing environmentally friendly and sustainable new energy is attracted. One approach is to generate fuel from water, carbon dioxide, and sunlight, by mimicking photosynthesis. Water splitting by a photocatalyst is an important reaction in a process of converting water to fuel such as hydrogen. Although generation of oxygen is a half-reaction of a water-splitting process (oxidation-reduction reaction), the generation of oxygen is considered to be the rate-limiting of an electrochemical reaction because the generation of oxygen involves generation of four electrons ($e^-$) and four protons ($H^+$). Materials or device structures that are highly active in oxygen evolution reaction and may efficiently convert a visible light photon into an electron-hole pair to promote an electrochemical (oxidation-reduction) reaction are desired. Materials or device structures that convert light photons to electricity (a photoelectric converter). Currently, an oxide-based cocatalyst structure using an oxide having an indirect gap of more than 2 eV is employed in many cases. The activity of oxygen evolution reaction (OER) is enhanced by using catalysts of noble metal oxides such as $IrO_x$ and $RuO_x$ as a cocatalyst. The conductivity and diversity of these metal oxides are derived from a d-band, and because the metal oxides have low carrier mobility and short diffusion length, the metal oxides are not necessarily appropriate materials as a photocatalyst. In addition, a catalyst material of the noble metal oxide has a limited change in a band gap, and design of a stepwise band gap structure is not possible. The cocatalyst is originally used for promoting OER. Instead of expensive cocatalyst materials, a new material and a new device structure capable of adjusting the band gap over a wide range as a light-absorbing layer are desired.

It is known that conversion efficiency is improved by taking an optimal combination of different band gaps Eg (for example, Alexis De Vos, "Detailed balance limit of the efficiency of tandem solar cells", Journal of Physics D: Applied Physics, vol. 13, pp. 839-846, May 14, 1980). According to this literature, a tandem structure of a combination of two different band gaps (1.9 eV and 1.0 eV) is capable of improving conversion efficiency from 30% to 42% compared to a mono-layered structure with a band gap of 1.3 eV. Moreover, conversion efficiency may be further improved by applying a combination of three or more different band gaps to the tandem structure.

A configuration is known in which a band gap is adjusted by repeatedly stacking thin films of a first type oxide semiconductor and a second type oxide semiconductor different from the first type as an absorption layer of a photoelectrode (for example, refer to Japanese Laid-open Patent Publication No. 2017-130634). In addition, a structure using a photocatalyst of a Na super ionic conductor type (NACICON) is known (for example, refer to Japanese Laid-open Patent Publication No. 2012-248845).

SUMMARY

According to an aspect of the embodiments, an apparatus includes a conductive layer; a photocatalyst layer; and a light-absorbing layer arranged between the conductive layer and the photocatalyst layer, wherein the light-absorption layer is formed of one or a plurality of perovskite-type films (films), and each of the films contains tin (Sn), oxygen (O), sulfur (S), and one or more elements selected from Group 1 or Group 2 of the periodic table of elements, and each of the films formed by doping S for substituting an O site is set so that a band gap takes a predetermined value in a range between 0 eV to 4 eV.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a graph illustrating a band gap tuning by changing an addition amount (at %) of S;

FIG. 16 is a schematic view of a photoelectric converter for converting photons to electricity.

DESCRIPTION OF EMBODIMENTS

In a case where an optimal combination of band gaps is taken, conversion efficiency is theoretically brought close to 68% by infinitely increasing the number of band gaps to be combined, but a stacked structure having an infinite number of band gaps is unrealistic. In addition, as the number of band gaps to be combined increases, a difference $\Delta E_g$ in band gaps becomes smaller. Furthermore, even with a combination of two or three band gaps, it is difficult to realistically find a material that satisfies an optimal band gap value.

For example, in a case of using a mono-layered light-absorbing layer, it is considered that conversion efficiency of about 30% at maximum is obtained by using a material having a direct transition-type band gap of around 1.3 eV. As an existing material having a band gap of around 1.3 eV, cadmium telluride (CdTe) is mentioned. A band gap of gallium arsenide (GaAs) used as a compound semiconductor material in many cases is 1.43 eV, and actual conversion efficiency in a case where CdTe or GaAs is used for a light-absorbing layer is about 26% to 27%.

In an embodiment, a material capable of obtaining a desired band gap over a wide energy range is realized by facilitating adjustment (tuning) of the band gap of a light-absorbing layer, and an oxygen generating electrode is formed using the material. In addition, conversion efficiency is further improved by using a multi-layered light-absorbing layer that realizes an optimal combination of a plurality of band gaps.

A method for adjusting a band gap utilizes the fact that a band gap of a stannate-based material depends on a volumetric strain. A volumetric strain generated by an epitaxial growth may be used, or a volumetric strain due to chemical pressure may be generated by substitutively doping sulfur (S) into an oxygen (O) site to make the band gap adjustable.

Figure 1:
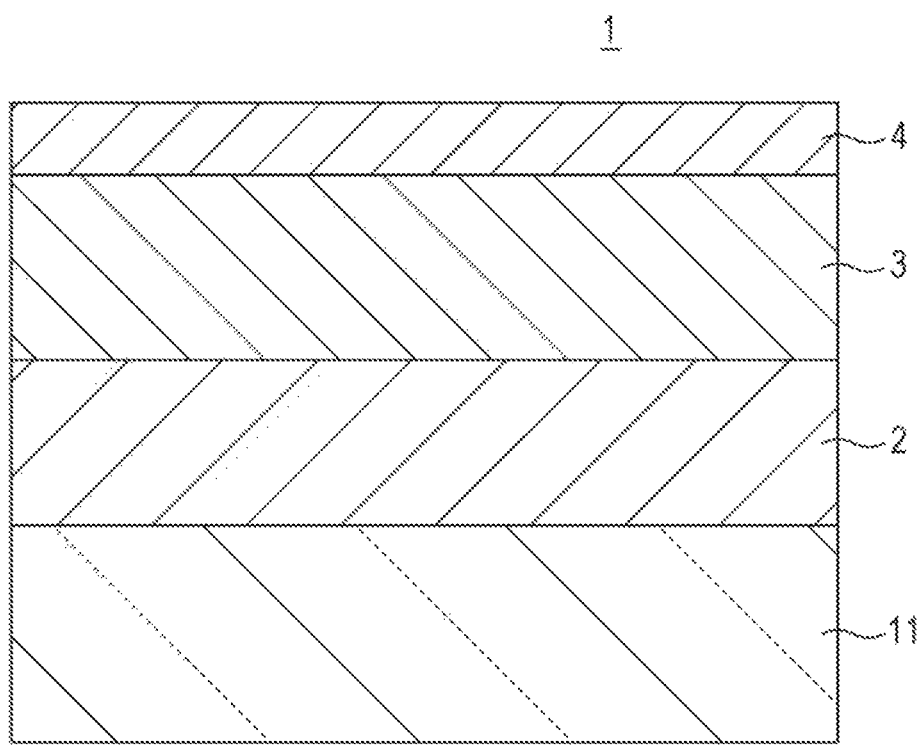
FIG. 1 is a view illustrating a basic configuration of an oxygen generating electrode of an embodiment.

FIG. 1 is a schematic view of an oxygen generating electrode 1 of an embodiment. The oxygen generating electrode 1 functions as a working electrode or an anode of an oxygen generating device or a water-splitting system. In the oxygen generating electrode 1, a conductive layer 2, a light-absorbing layer 3, and a photocatalyst layer 4 are stacked in this order on a substrate 11. The substrate 11 is a support substrate for supporting a stacked body thereon, but may be omitted. In this example, assuming that light is incident from a back surface of the substrate 11, a light-transmitting insulation substrate is used. In this case, the substrate 11 has a band gap greater than that of the light-absorbing layer 3.

For example, in a case where a band gap of the light-absorbing layer 3 is 3 eV, the substrate 11 of which a band gap is greater than 3 eV is used. Examples of a material of such a substrate include $SrTiO_3$, LSAT (Lanthanum Strontium Aluminum Tantalum oxide), $LaAlO_3$, MgO, $NdGaO_3$, and $DyScO_3$.

The conductive layer 2 is, for example, a degenerately doped (highly doped) perovskite-type thin film and contains at least tin (Sn) and oxygen (O). As a material of the conductive layer 2, for example, $Ba_{1-x}La_xSnO_3$, $BaSn_{1-x}Sb_xO_3$, $Sr_{1-x}La_xSnO_3$, $SrSn_{1-x}Sb_xO_3$, or the like may be used.

The light-absorbing layer 3 includes one or more perovskite-type thin films. Each of the thin films forming the light-absorbing layer 3 contains Sn, O, and sulfur (S), and one or more elements selected from Group 1 or Group 2 of the periodic table of elements. A band gap Eg of the light-absorbing layer 3 may be designed to be a desired value in a range between 0 eV to 4 eV and equation (0 eV<Eg<4 eV) by adjusting an addition amount of S in the light-absorbing layer 3. As an element selected from Group 1 or Group 2 of the periodic table, for example, Ba, Sr, or K is used.

In a case where the light-absorbing layer 3 is formed of a mono-layered thin film, a direct transition-type band gap of the thin film may be designed to be a desired value, for example, in a range of 0.9 to 3.1 eV. This energy range substantially covers an energy range of visible light.

In a case where the light-absorbing layer 3 is formed of a plurality of thin films, a band gap is designed to be gradually decreased in order from a layer closest to a side where light is incident. In a favorable configuration example, depending on the number of thin films used, a content proportion $(S/S_xO_{3-x})$ of S in each thin film is adjusted so that an optimal combination of band gaps is achieved. The plurality of thin films included in the light-absorbing layer 3 are thin films formed of the same material, and the band gaps thereof are adjusted by adjusting a content proportion of S.

The chemical pressure generated by substitutively doping S into an O site changes a volume of a crystal cell and the band gap. Therefore, although a composition ratio of S and O changes depending on the target band gap among the perovskite-type thin films of the light-absorbing layer 3, a ratio of Sn to an element selected from Group 1 or Group 2 is fixed.

For example, in a case where the light-absorbing layer 3 has a multi-layered structure of $BaSnS_xO_{3-x}$, a value of x is set for each thin film in a predetermined range (for example, 0<x<0.25) depending on the number of the thin films. This will be described later with reference to a second embodiment and a third embodiment. In addition, even in a case where a multi-layered structure of $SrSnS_xO_{3-x}$ is used as the light-absorbing layer 3, a value of x is set for each thin film in a predetermined range (for example, 0<x<0.33) depending on the number of the thin films to be used.

The photocatalyst layer 4 is formed of any material that causes a photochemical reaction (catalysis) by irradiation with light. An oxide material containing one or more elements selected from cobalt (Co), iron (Fe), and nickel (Ni) may be used as the photocatalyst layer 4.

The oxygen generating electrode 1 may freely design the band gap by adjusting a proportion of S in the perovskite-type thin film included in the light-absorbing layer 3, absorbs sunlight over a wide energy range of visible light, and thus is capable of improving conversion efficiency.

Figure 2:
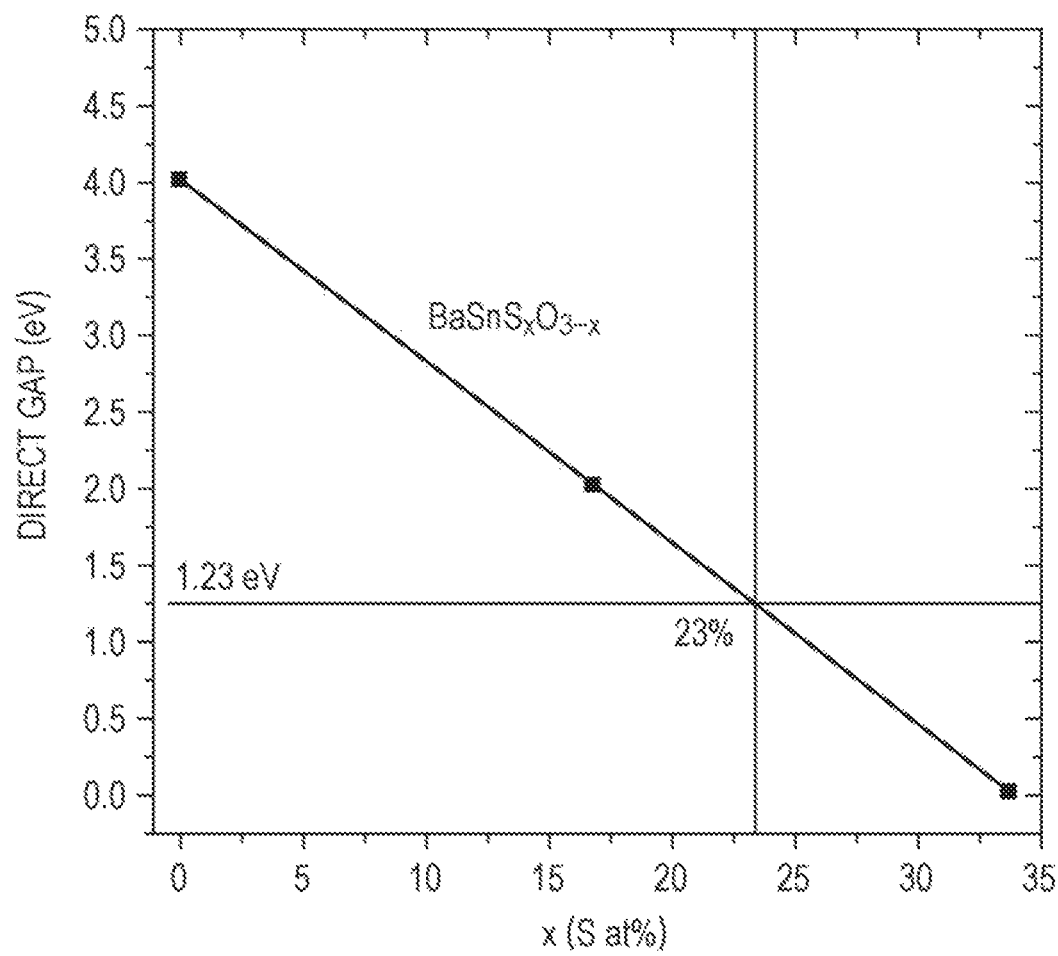
FIG. 2 is a graph illustrating a band gap tuning of a light-absorbing layer of the embodiment.

FIG. 2 is a graph illustrating a band gap tuning of the light-absorbing layer 3 of the embodiment, and illustrates a direct transition-type band gap calculated based on a density functional theory (DFT) as a function of a doping amount (at %) of S. Herein, a composition of the light-absorbing layer 3 is $BaSnS_xO_{3-x}$. The direct transition-type band gap may be changed by changing an addition amount of S in $BaSnS_xO_{3-x}$. An O site is substituted by S to change a volume of a cell, and a band structure changes due to a volumetric strain.

The band gap approaches 4.0 eV as a proportion x of S in $BaSnS_xO_{3-x}$ approaches 0 at %. In a case where the proportion x of S is 16.7 at %, the band gap of $BaSnS_xO_{3-x}$ is 2.0 eV. The band gap approaches 0 eV as x approaches 33 at %.

The direct transition-type band gap of the light-absorbing layer 3 changes linearly by changing the proportion x of S. The band gap may be freely designed in a range of 0 eV to 4 eV simply by changing the addition amount or the proportion of S in the light-absorbing layer 3. For example, in a case where the band gap of the light-absorbing layer 3 is desired to be 1.23 eV, a proportion x of S is required to be 23 at %. In a case where the band gap is desired to be 1.3 eV, the addition amount of S is required to be slightly reduced. Although an addition amount of S required to obtain the target band gap varies depending on a configuration of a base material, the control tendency is the same, and the band gap of the light-absorbing layer 3 may be designed as a function of an addition amount of S.

In addition, since a desired band gap may be obtained simply by controlling the proportion x of S using the same material, even in a case of forming the light-absorbing layer 3 with a plurality of thin films having different band gaps, the band gap may be designed to be a desired value simply by adjusting a proportion of S in each layer. A wide range of visible light is covered and high conversion efficiency may be obtained by using the plurality of thin films having different band gaps.

Figure 3:
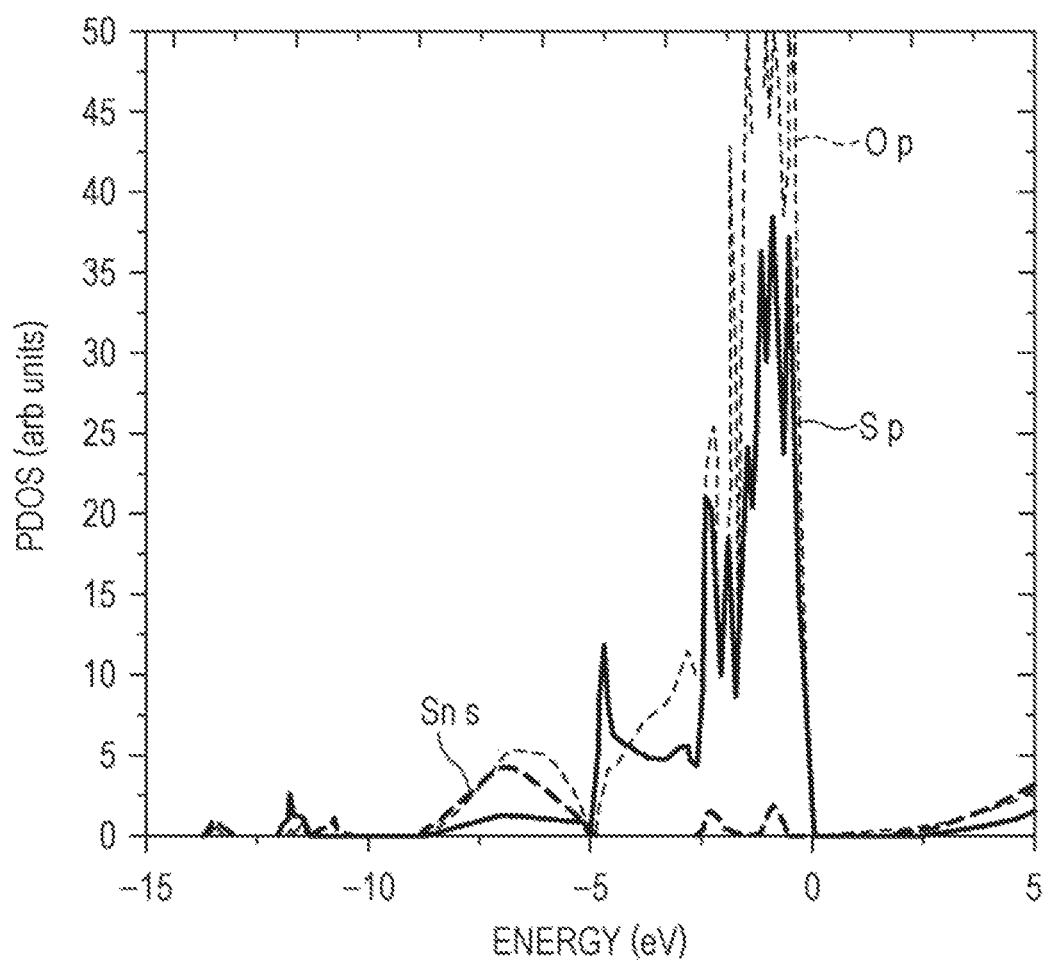
FIG. 3 is a graph illustrating partial density of states (PDOS) of S and O.

FIG. 3 is a graph illustrating partial density of states (PDOS) of S and O. A horizontal axis is energy (eV). A p state of S and a 2p state of O take approximately the same energy range in a valence band, and an O site may be substituted by S. By adding S, as illustrated by the spectrum indicated by a thick broken line, a conduction band of a 5 s orbital of Sn is diversified (multi-branched) to increase the electron mobility, and an effect that the life of the carrier is extended is also obtained.

Specific examples of configuration which enables a band gap to be adjusted by controlling the addition amount of S are described below.

First Embodiment

Figure 4:
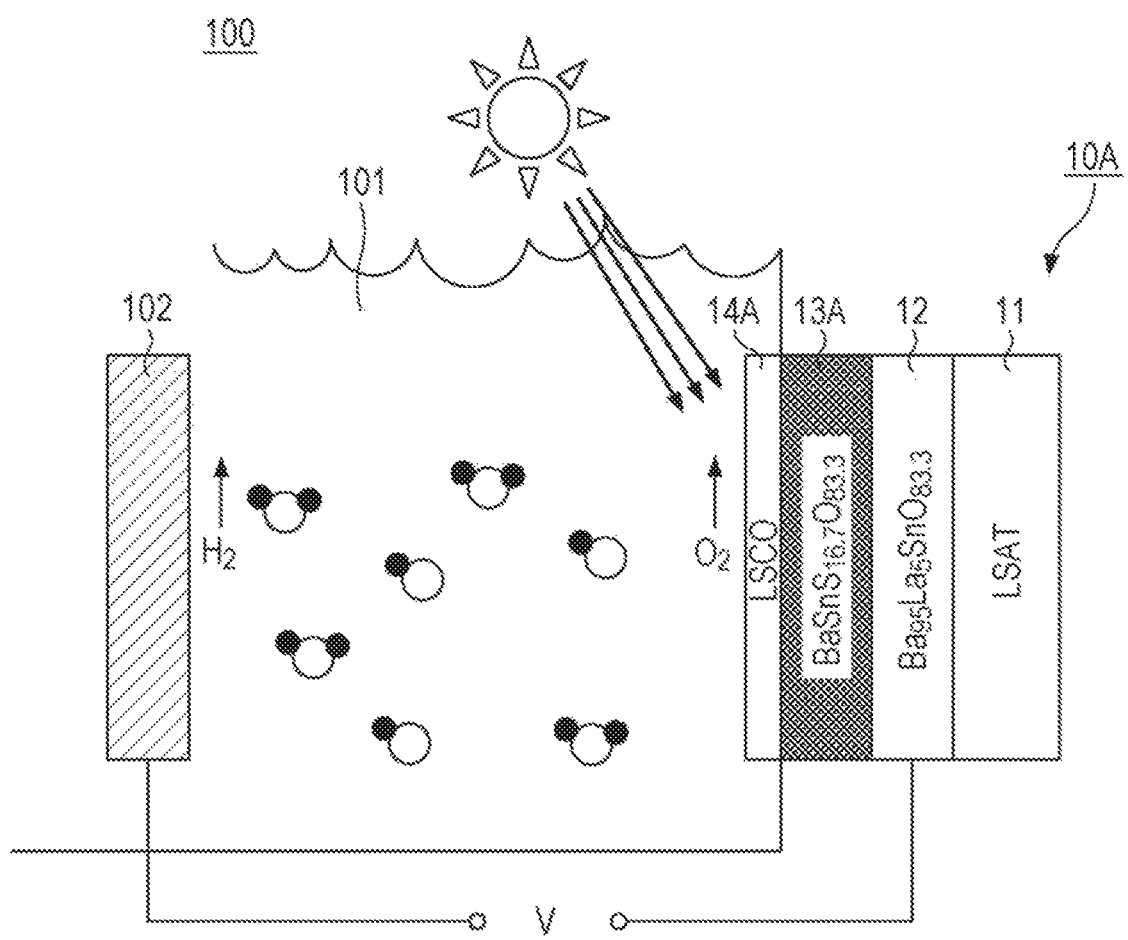
FIG. 4 is a schematic view of an oxygen generating electrode according to a first embodiment and an oxygen generating device using the same.

FIG. 4 is a schematic view of an oxygen generating electrode 10A according to a first embodiment and an oxygen generating device 100 using the same. In the first embodiment, a light-absorbing layer is formed of a monolayered perovskite-type thin film. The perovskite-type thin film contains Sn, O, and S, and a proportion of S is set so that a desired band gap is obtained.

A basic configuration of the oxygen generating electrode 10A is the same as that of FIG. 1, and a conductive layer 12, a light-absorbing layer 13A, and a photocatalyst layer 14A are stacked in this order on a substrate 11. In this example, an LSAT (001) substrate having a thickness of 0.5 mm is used as the substrate 11. A band gap of the LSAT substrate 11 is 5 eV. The substrate 11 may be omitted depending on an incident direction of light.

As the conductive layer 12, for example, BaLaSnO having a thickness of 60 nm is used. A composition of the conductive layer 12 is, for example, $Ba_{95}La_5SnO_{83.3}$. The conductive layer 12 exhibits n-type conductivity due to the addition of La. The subscript number which indicates a proportion of each element is represented by at % (atomic percentage).

The light-absorbing layer 13A is a perovskite-type thin film formed of a monolayer of $BaSnS_xO_{3-x}$ and having a thickness of 100 nm. In this example, an element selected from Group 1 or Group 2 of the periodic table is Ba. A specific example of a composition is $BaSnS_{16.7}O_{83.3}$. In this composition, a band gap of the light-absorbing layer 13A is about 2.0 eV, and light having a wavelength shorter than a red wavelength in visible light may be efficiently absorbed. The light-absorbing layer 13A is an undoped (i-type) layer, but a current flows in one direction at a junction surface with the conductive layer 12, like a pn junction.

As the photocatalyst layer 14A, for example, LSCO ($La_{0.7}Sr_{0.3}CoO_3$) having a thickness of 2 nm is used. In the example of FIG. 4, light is incident from the side of the photocatalyst layer 14A.

The oxygen generating electrode 10A is used as a working electrode or an anode of the oxygen generating device 100. The oxygen generating electrode 10A is disposed so that the surface (an uppermost surface in a stacking direction) of the photocatalyst layer 14A is in contact with an electrolyte solution 101. The electrolyte solution 101 contains water and a hydroxide. A counter electrode 102 is provided at a position facing the oxygen generating electrode 10A with the electrolyte solution 101 interposed therebetween. The counter electrode 102 functions as a cathode. The counter electrode 102 is formed of platinum (Pt), iridium (Ir), palladium (Pd), or the like.

When photons (hv) having energy greater than the band gap of the light-absorbing layer 13A are incident on the light-absorbing layer 13A of the oxygen generating electrode 10A, the photons are absorbed, and electrons ($e^-$) and holes ($h^+$) are generated. The application of the electric field causes the holes to be drawn to the side of the photocatalyst layer 14A. The electrons reach the surface of the counter electrode 102 through wiring.

In the electrolyte solution 101, hydrogen and oxygen are generated by an oxidation-reduction reaction of water due to electrons and holes. A hydrogen evolution reaction is represented by $2H_2O+2e^- \rightarrow H_2+2OH^-$. Hydrogen gas and a hydroxyl group ($OH^-$) are generated from water by a reducing power of electrons. The hydroxyl group $OH^-$ is drawn to the side of the oxygen generating electrode 10A. An oxygen evolution reaction is represented by $4OH^- \rightarrow O_2+2H_2O+4e^-$. Oxygen gas is generated by an oxidizing power of the holes reaching the surface of the photocatalyst layer 14A.

Figure 5:
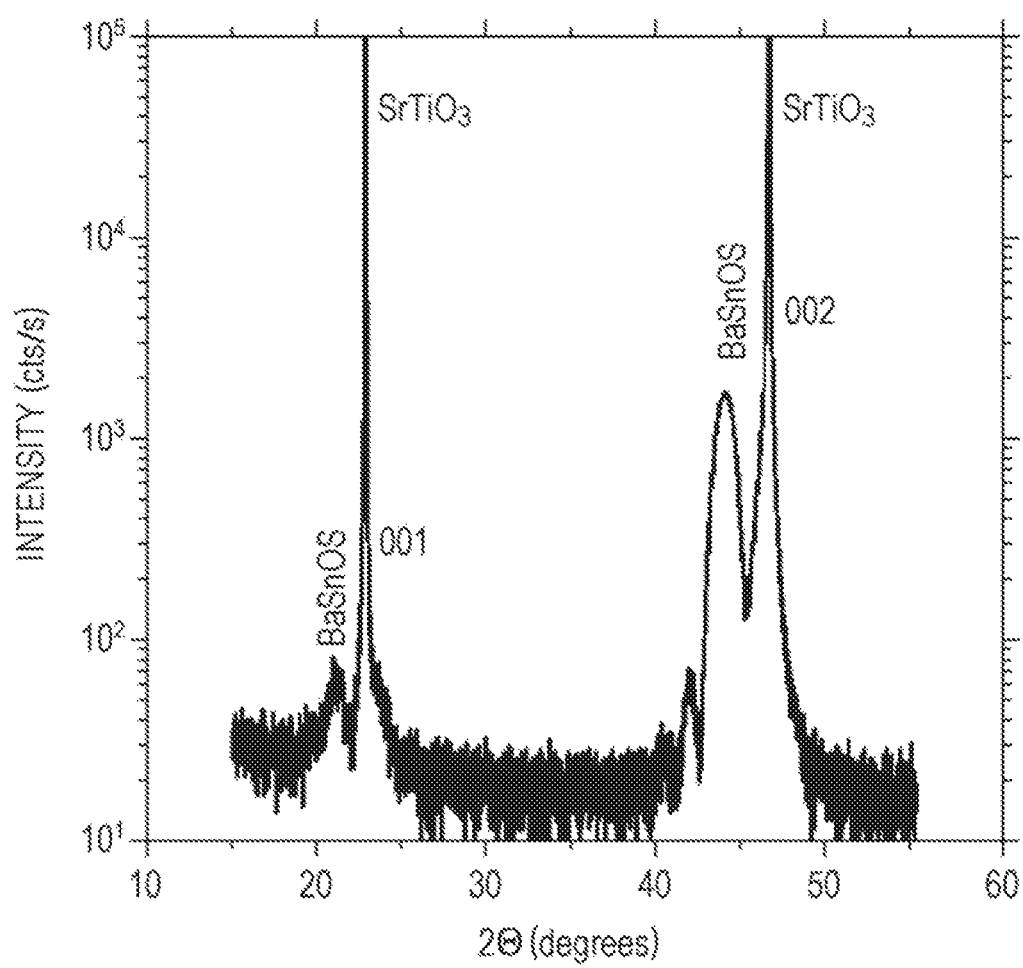
FIG. 5 illustrates an X-ray diffraction pattern of a BaSnOS film formed on a $SrTiO_3$ substrate.

FIG. 5 illustrates an X-ray diffraction pattern of a $BaSnS_xO_{3-x}$ film formed on a $SrTiO_3$ substrate. The $BaSnS_xO_{3-x}$ film is formed by a pulsed laser deposition (PLD) method using a $BaSnO_3$ target doped with S. From the diffraction pattern, it is seen that a perovskite crystal phase in which sulfur (S) is incorporated grows well.

Figure 6A:
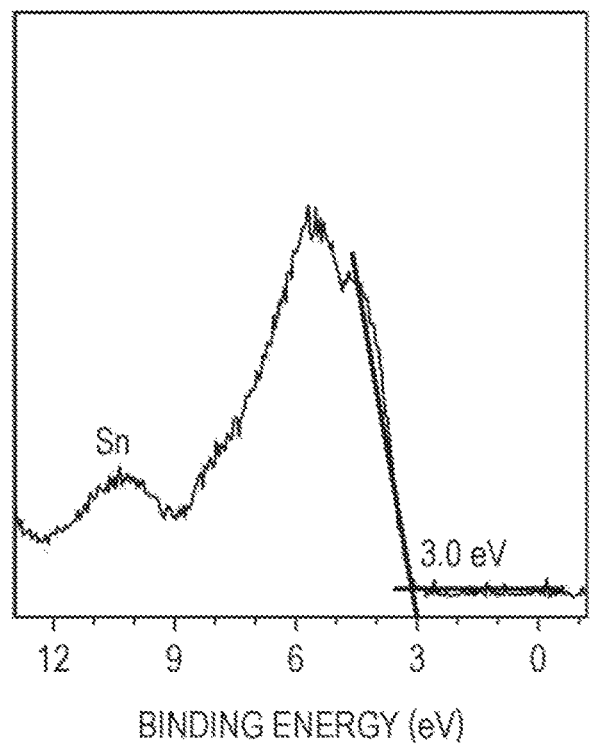
FIG. 6A illustrates an XPS spectrum of a conductive layer of the oxygen generating electrode of the first embodiment.
Figure 6B:
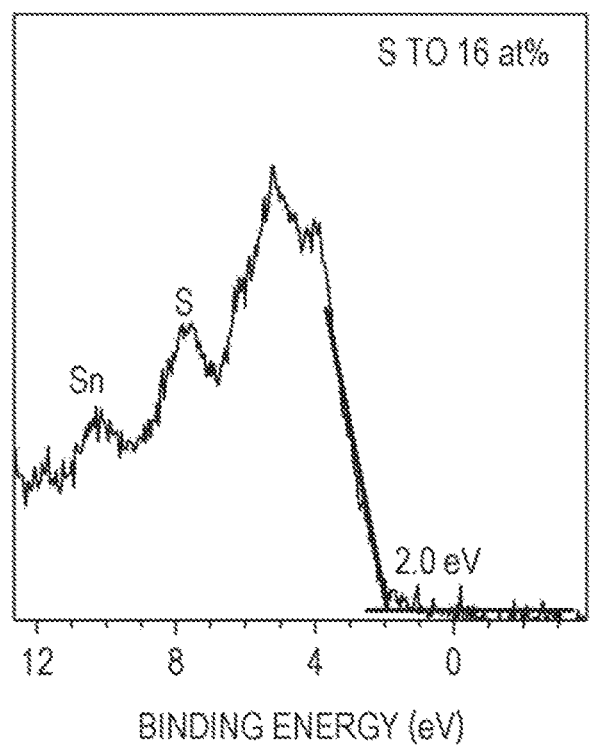
FIG. 6B illustrates an XPS spectrum of a light-absorbing layer of the oxygen generating electrode of the first embodiment.

FIG. 6A is a spectrum of X-ray photoelectron spectroscopy (XPS) of BaLaSnO used in the conductive layer 12, and FIG. 6B is a spectrum of XPS of BaSnOS used in the light-absorbing layer 13A. In FIGS. 6A and 6B, a moderate peak on the leftmost side is a peak position of binding energy of Sn, and a large peak on the right side is a peak position of binding energy of a 2p orbital of O.

In FIG. 6B, a peak of S appears between a peak of Sn and a peak of O. While an edge of a valence band is near 3.0 eV in the conductive layer 12 of FIG. 6A, the edge of the valence band shifts to near 2.0 eV in FIG. 6B. From FIGS. 6A and 6B, it is illustrated that the band gap may be reduced by adding 16 at % of S.

FIG. 7 is a graph illustrating a band gap tuning by changing an addition amount (at %) of S. A direct transition-type band gap in a case where a proportion x of S in $BaSnS_xO_{3-x}$ is changed to 9 at %, 15 at %, 21 at %, or 25 at % is examined. In FIG. 7, a horizontal axis is photon energy hv (eV) and a vertical axis is $(\alpha hv)^2$. As the addition amount of S is increased, the photon energy shifts to a side where the photon energy is lower. From FIG. 7, it is seen the band gap is adjusted between 0.9 eV and 3.1 eV by changing the addition amount of S in a range of 9 at % to 25 at %.

Figure 8:
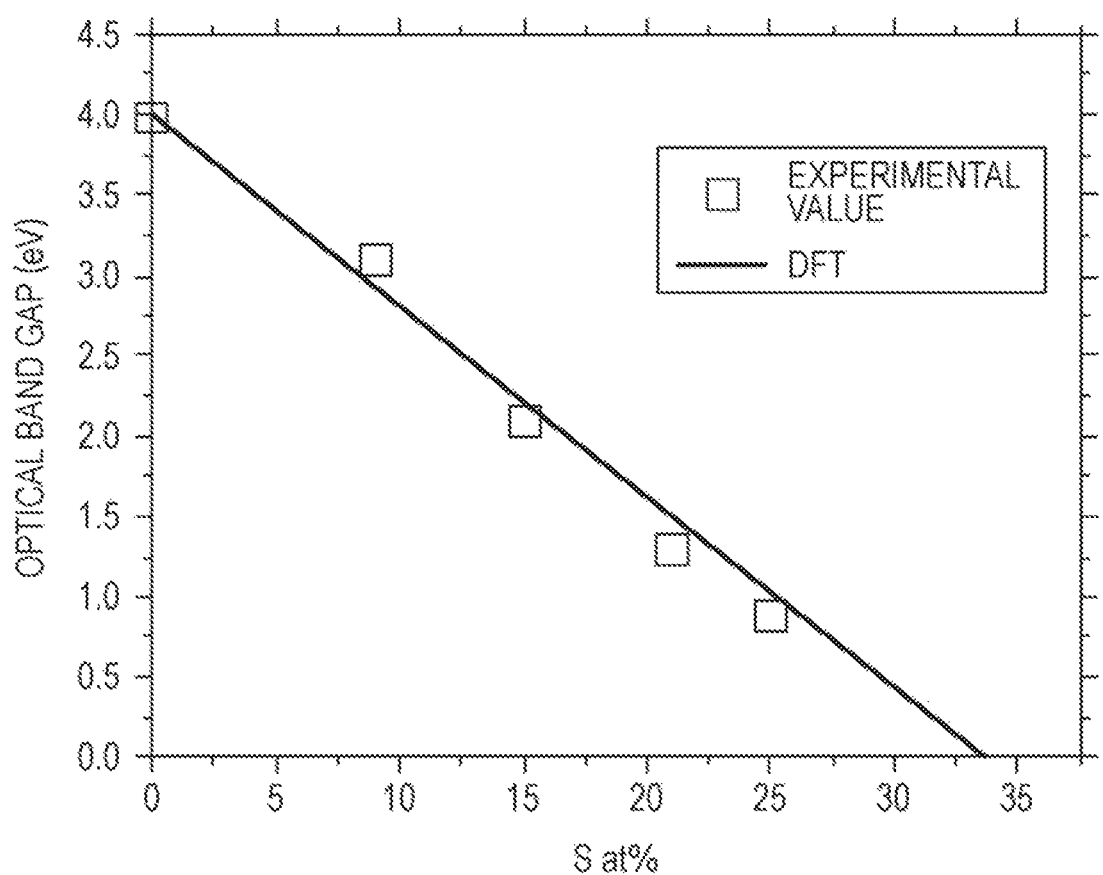
FIG. 8 is a graph illustrating a band gap as a function of an addition amount of S.

FIG. 8 illustrates an optical band gap (eV) as a function of an addition amount (at %) of S. Square marks indicate experimental values, and a straight line indicates values calculated by DFT. The experimental values fit well to the theoretical values, and it is proven that the band gap is adjustable in a range of 0 to 4 eV by controlling an amount of S doped into a film formation target and a film formation condition.

Figure 9:
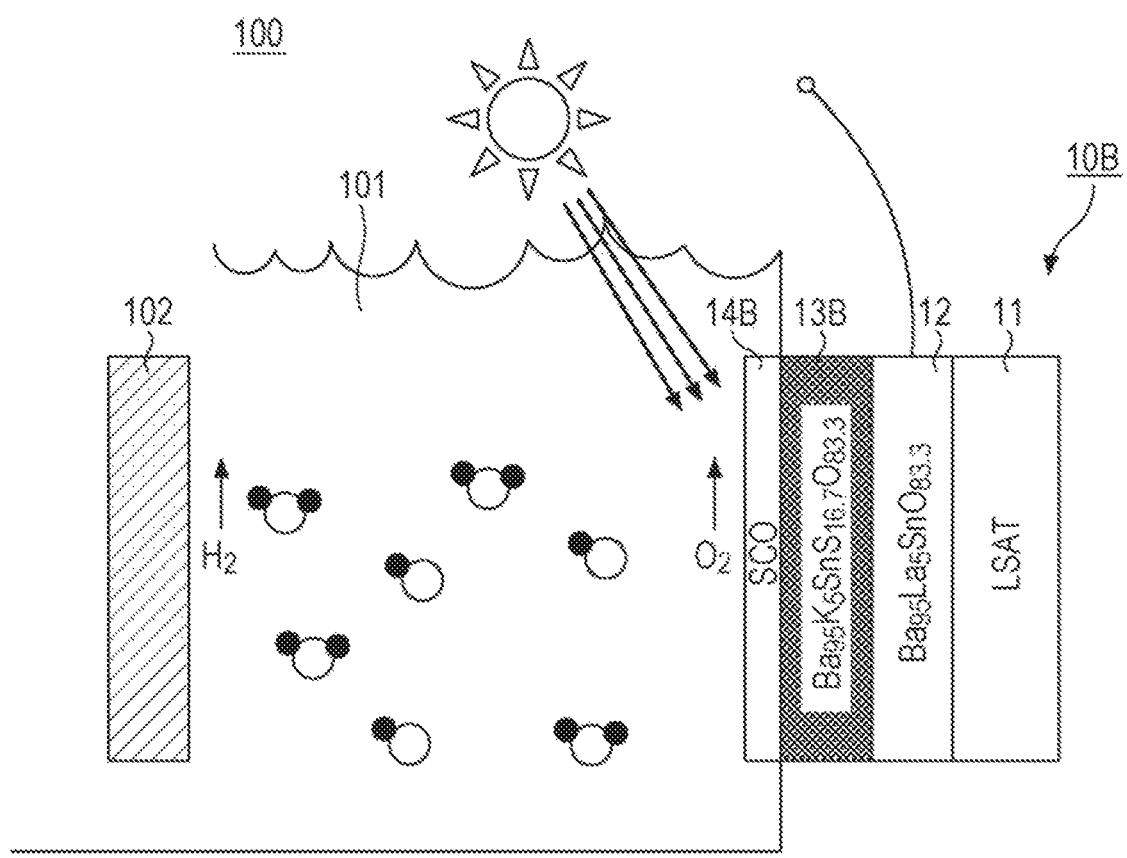
FIG. 9 is a view illustrating another configuration example of the oxygen generating electrode according to the first embodiment.

FIG. 9 is a view illustrating another configuration example of the oxygen generating electrode according to the first embodiment. An oxygen generating electrode 10B is different from the oxygen generating electrode 10A of FIG. 4 in the composition of the light-absorbing layer and the type of the photocatalyst layer. As a light-absorbing layer, a perovskite-type thin film represented by $Ba_{1-y}K_ySnS_xO_{3-x}$ is used.

In the oxygen generating electrode 10B, the conductive layer 12, a light-absorbing layer 13B, and a photocatalyst layer 14B are stacked in this order on the substrate 11. Similarly to the configuration of FIG. 4, an LSAT (001) substrate having a band gap of 5 eV is used as the substrate 11, but the substrate 11 may not be required.

Similarly to the oxygen generating electrode 10A of FIG. 4, the conductive layer 12 is a layer formed of $Ba_{95}La_5SnO_{83.3}$ and having a thickness of 100 nm. The conductive layer 12 exhibits n-type conductivity due to the addition of La.

The light-absorbing layer 13B is a layer having a thickness of 100 nm, which is formed by a PLD method, and is formed of a monolayer of $Ba_{95}K_5SnS_{16.7}O_{83.3}$. The subscript number which indicates a proportion of each element is represented by at % (atomic percentage). In this example, elements selected from Group 1 or Group 2 of the periodic table are Ba and K. By adding K, the light-absorbing layer 13B exhibits p-type conductivity, and a pn junction is formed at an interface with an n-type conductive layer 12.

A band gap of the light-absorbing layer 13B is about 2.0 eV, which is the same as that of the oxygen generating electrode 10A of FIG. 4. The light-absorbing layer 13B may efficiently absorb light having a wavelength shorter than a red wavelength in visible light.

As the photocatalyst layer 14B, SCO ($SrCoO_3$) film having a thickness of 2 nm is used. The oxygen generating electrode 10B is used as a working electrode of an oxygen generating device 100, and the surface (an uppermost surface in a stacking direction) of the photocatalyst layer 14B is in contact with the electrolyte solution 101. The counter electrode 102 is provided at a position facing the oxygen generating electrode 10B with the electrolyte solution 101 interposed therebetween.

Also in this configuration, by controlling a proportion of S in the light-absorbing layer 13B of the oxygen generating electrode 10B, a band gap is set to a desired value, and thus conversion efficiency may be optimized. For example, the band gap may be designed to be 1.3 eV by increasing the addition amount of S to 21 to 22% (refer to FIG. 7).

Second Embodiment

Figure 10:
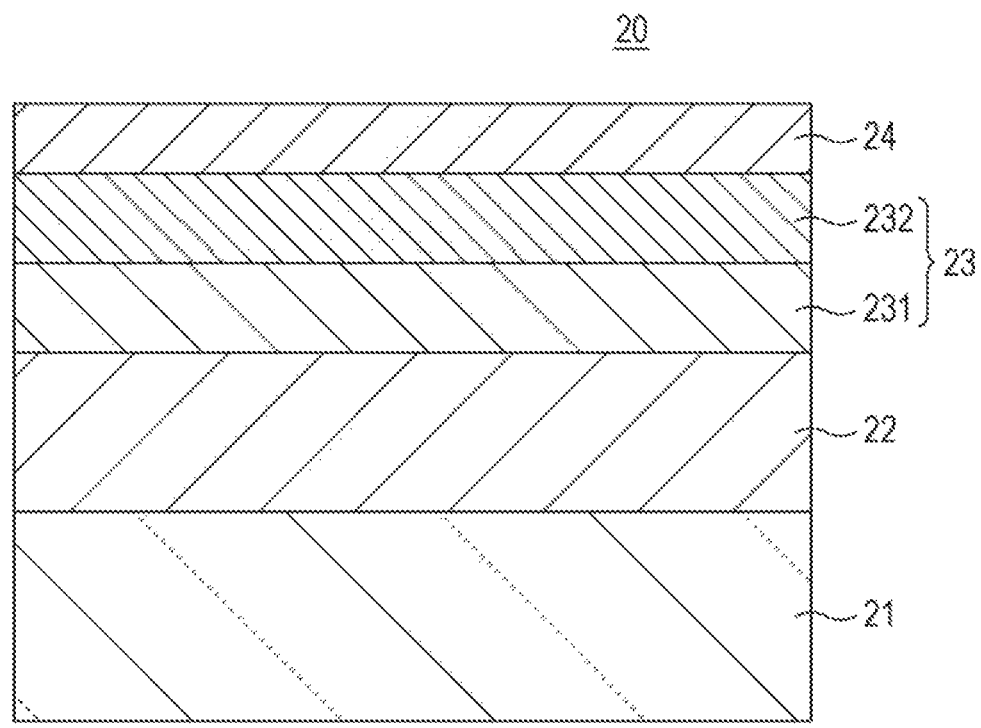
FIG. 10 is a schematic view of an oxygen generating electrode according to a second embodiment.

FIG. 10 is a schematic view of an oxygen generating electrode 20 according to a second embodiment. In the second embodiment, a multi-layered light-absorbing layer is used.

In the oxygen generating electrode 20, a conductive layer 22, a light-absorbing layer 23, and a photocatalyst layer 24 are stacked in this order on a substrate 21. The substrate 21 is a support substrate for supporting a stacked body thereon, but may be omitted depending on the incident direction of light. In this example, assuming that light is incident from a back surface of the substrate 21, a light-transmitting insulation substrate is used.

The conductive layer 22 is, for example, a degenerately doped (highly doped) perovskite-type thin film and contains at least tin (Sn) and oxygen (O). As a material of the conductive layer 22, $Ba_{1-x}La_xSnO_3$, $BaSn_{1-x}Sb_xO_3$, $Sr_{1-x}La_xSnO_3$, $SrSn_{1-x}Sb_xO_3$, or the like may be used.

The light-absorbing layer 23 includes two perovskite-type thin films. Each of thin films 231 and 232 which form the light-absorbing layer 23 contains Sn, O, and sulfur (S), and one or more elements selected from Group 1 or Group 2 of the periodic table, and has an adjustable band gap Eg in a range of 0 to 4 eV. For example, the thin film 231 and the thin film 232 are formed of the same material, but content proportions of S in the thin films are different.

In this example, since it is assumed that light is incident from the back surface of the substrate 21, the band gap of the thin film 231 is designed to be greater than that of the thin film 232, and the band gap of the conductive layer 22 is designed to be greater than that of the thin film 231. In a case of focusing on the content proportion of S, the content proportion ($S/S_xO_{3-x}$) of S in the thin film 231 is lower than that of S in the thin film 232.

By forming the light-absorbing layer 23 with a plurality of thin films having different content proportions of S, light of different wavelength bands may be absorbed, and thus conversion efficiency may be improved as compared to a mono-layered light-absorbing layer.

Figure 11:
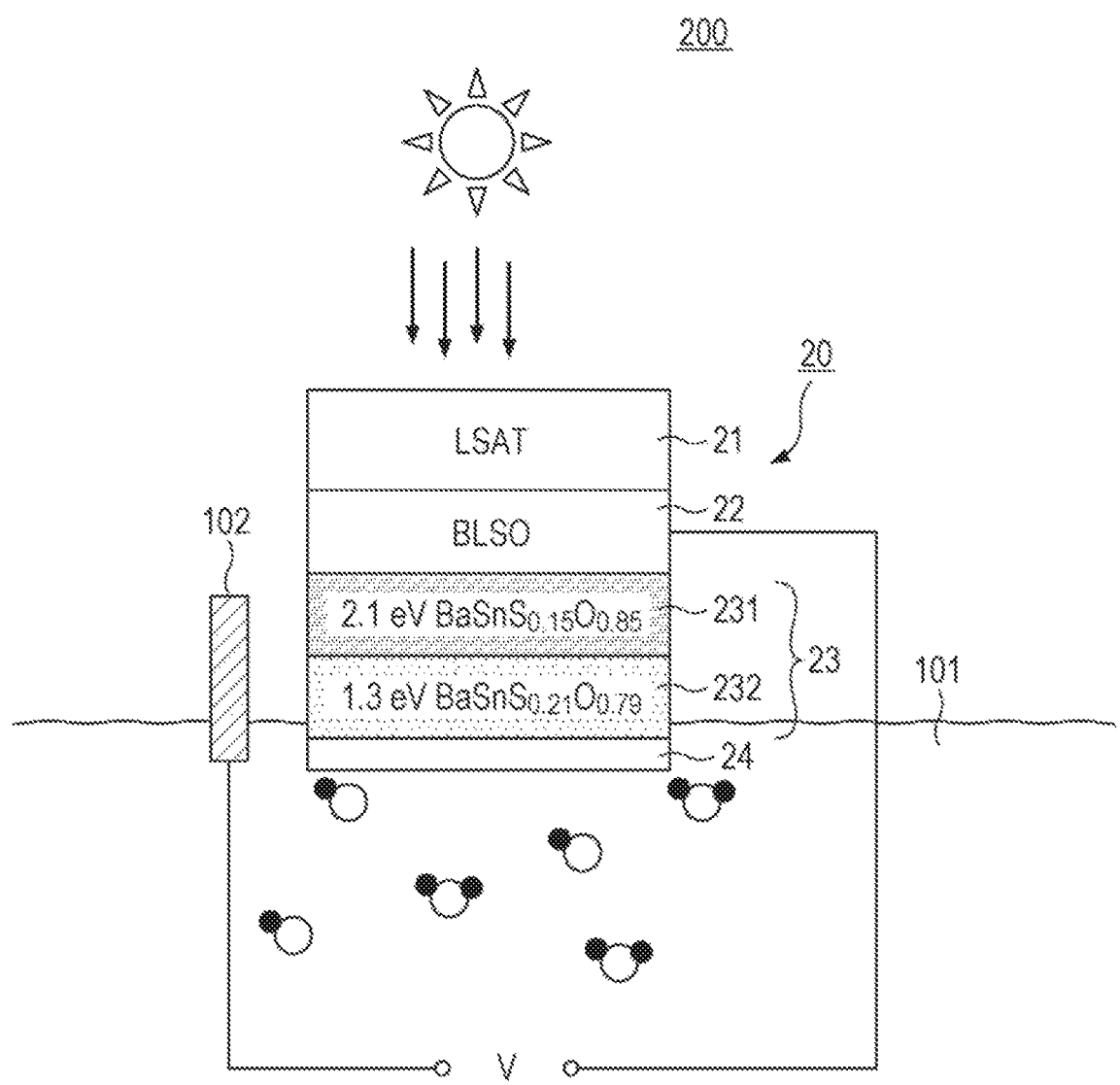
FIG. 11 is a schematic view of an oxygen generating device using the oxygen generating electrode according to the second embodiment.

FIG. 11 is a schematic view of an oxygen generating device 200 using the oxygen generating electrode 20 of FIG. 10. The oxygen generating device 200 has the oxygen generating electrode 20, the electrolyte solution 101, and the counter electrode 102. The photocatalyst layer 24 of the oxygen generating electrode 20 is in contact with the electrolyte solution 101.

In the light-absorbing layer 23, the thin film 231 closer to the substrate 21 is, for example, a thin film of $BaSnS_{0.15}O_{0.35}$ having a thickness of 50 nm, and has a band gap of 2.1 eV. The thin film 232 is, for example, a thin film of $BaSnS_{0.21}O_{0.79}$ having a thickness of 50 nm, and has a band gap of 1.3 eV. The conductive layer 22 is formed of BLSO (BaLaSrO) and has a band gap of 3.1 eV.

In sunlight which is incident from the back surface of the substrate 21 and passes through the conductive layer 22, a light component having photon energy greater than 2.1 eV is absorbed by the thin film 231 and contributes to the generation of carriers. Other light rays are transmitted through the thin film 231. In the transmitted light, a light component having photon energy greater than 1.3 eV is absorbed by the thin film 232 and contributes to the generation of carriers.

Figure 12:
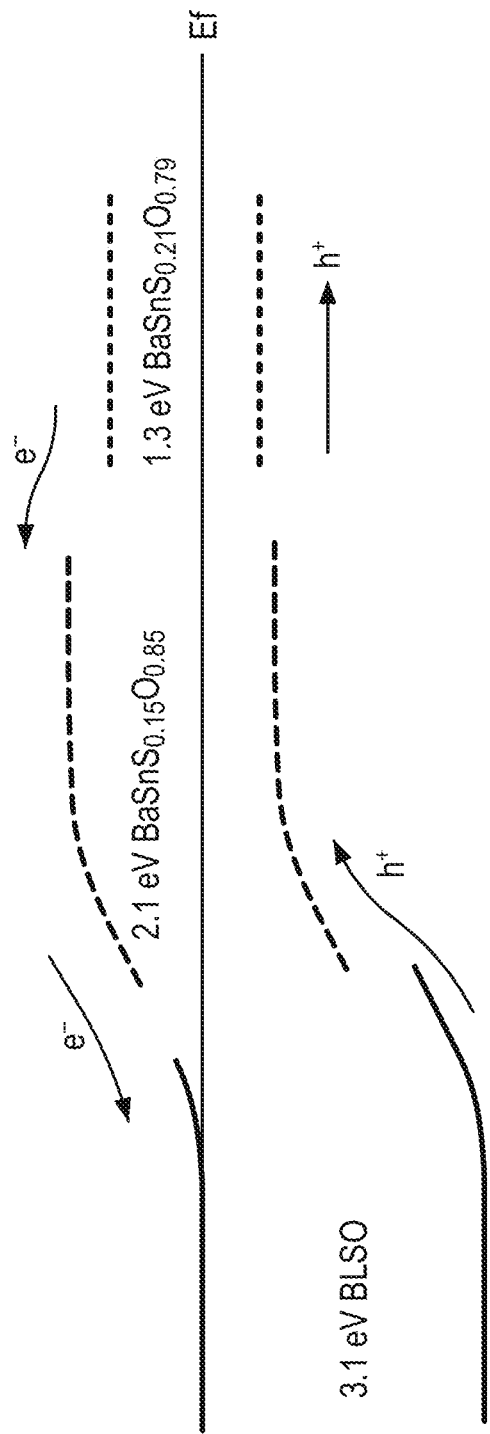
FIG. 12 is a view illustrating a structure of a band gap of the oxygen generating electrode according to the second embodiment.

FIG. 12 is a schematic view of a band structure of the conductive layer 22 and the light-absorbing layer 23. Photons having energy of 3.1 eV are absorbed by BLSO of the conductive layer 22 to generate carriers. Light having energy of 3.1 eV or less is transmitted and enters the thin film 231. In the thin film 231, a level of a valence band is shifted up due to the addition of S. Light having energy exceeding 2.1 eV is absorbed by the thin film 231 to generate carriers. Light having energy of 2.1 eV or less is transmitted.

A level of a valence band in the thin film 232 is higher than that in the thin film 231 due to the increase of the addition amount of S. Light having energy exceeding 1.3 eV is absorbed by the thin film 232 to generate carriers. The electrons move from the thin film 232 to the thin film 231, and further to the conductive layer 22. The holes move from the conductive layer 22 to the thin film 231, and further to the thin film 232, and then move to an interface between the photocatalyst layer 24 and the electrolyte solution 101. With this configuration, an amount of a photoelectric current flowing is increased, and an oxygen evolution reaction on the surface of the photocatalyst layer 24 is promoted.

The band gaps of the thin films 231 and 232 are not limited to the above combination, and any combination of band gaps may be achieved by controlling an addition proportion of S. For example, the addition proportion of S may be controlled so that a combination becomes 1.0 eV and 1.9 eV in an indirect transition-type band gap. Accordingly, visible light may be absorbed in a wide range to improve conversion efficiency.

Third Embodiment

Figure 13:
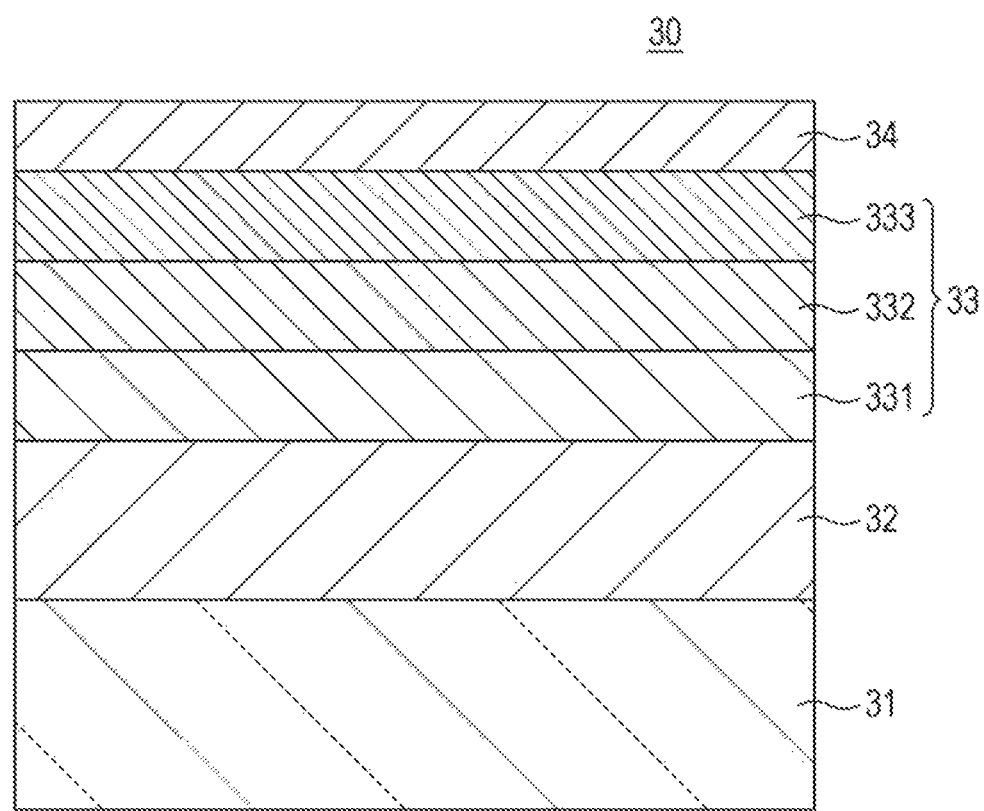
FIG. 13 is a schematic view of an oxygen generating electrode according to a third embodiment.

FIG. 13 is a schematic view of an oxygen generating electrode 30 according to a third embodiment. In the third embodiment, a light-absorbing layer having a three-layered structure is used.

In the oxygen generating electrode 30, a conductive layer 32, a light-absorbing layer 33, and a photocatalyst layer 34 are stacked in this order on a substrate 31. The substrate 31 is a support substrate for supporting a stacked body thereon, but may be omitted depending on the incident direction of light. In this example, assuming that light is incident from a back surface of the substrate 31, a light-transmitting insulation substrate is used.

The conductive layer 32 is, for example, a degenerately doped (highly doped) perovskite-type thin film and contains at least tin (Sn) and oxygen (O). As a material of the conductive layer 32, $Ba_{1-x}La_xSnO_3$, $BaSn_{1-x}Sb_xO_3$, $Sr_{1-x}La_xSnO_3$, $SrSn_{1-x}Sb_xO_3$, or the like may be used.

The light-absorbing layer 33 includes three perovskite-type thin films. Each of the thin films 331, 332, and 333 which form the light-absorbing layer 33 contains Sn, O, and sulfur (S), and one or more elements selected from Group 1 or Group 2 of the periodic table, and has an adjustable band gap Eg in a range of 0 to 4 eV. The thin films 331 to 333 are formed of the same material, but content proportions of S in the thin films are different.

In this example, since it is assumed that light is incident from the back surface of the substrate 31, a band gap of the thin film is designed to be greater as the thin film is closer to the substrate 31. The band gap decreases in order of the thin film 331, 332, and 333. In a case of focusing on the content proportion of S, the content proportion ($S/S_xO_{3-x}$) of S increases in order of the thin film 331, 332, and 333.

By forming the light-absorbing layer 33 with a plurality of thin films having different content proportions of S, light of different wavelength bands may be absorbed, and thus conversion efficiency may be improved as compared to a mono-layered light-absorbing layer.

Figure 14:
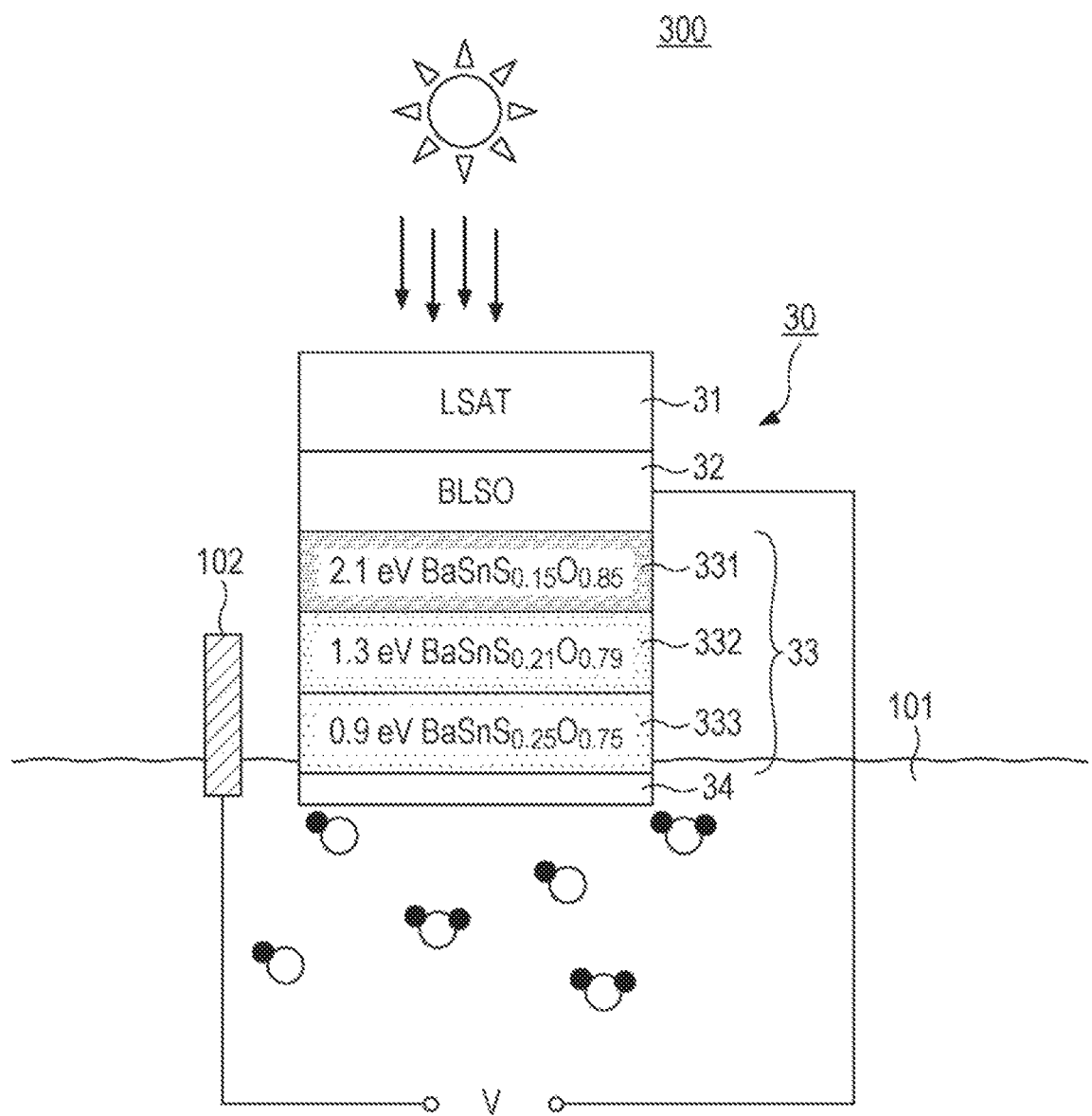
FIG. 14 is a schematic view of an oxygen generating device using the oxygen generating electrode according to the third embodiment.

FIG. 14 is a schematic view of an oxygen generating device 300 using the oxygen generating electrode 30 of FIG. 13. The oxygen generating device 300 has the oxygen generating electrode 30, the electrolyte solution 101, and the counter electrode 102. The photocatalyst layer 34 of the oxygen generating electrode 30 is in contact with the electrolyte solution 101.

In the light-absorbing layer 33, the thin film 331 closest to the substrate 31 is, for example, a thin film of $BaSnS_{0.15}O_{0.85}$ having a thickness of 33 nm, and has a band gap of 2.1 eV. The thin film 332 is, for example, a thin film of $BaSnS_{0.21}O_{0.79}$ having a thickness of 33 nm, and has a band gap of 1.3 eV. The thin film 333 is, for example, a thin film of $BaSnS_{0.25}O_{0.75}$ having a thickness of 33 nm, and has a band gap of 0.9 eV. The conductive layer 32 is formed of BLSO (BaLaSrO) and has a band gap of 3.1 eV.

In sunlight which is incident from the back surface of the substrate 31 and passes through the conductive layer 32, a light component having photon energy greater than 2.1 eV is absorbed by the thin film 331 and contributes to the generation of carriers. Other light rays are transmitted through the thin film 331. In the transmitted light, a light component having photon energy greater than 1.3 eV is absorbed by the thin film 332 and contributes to the generation of carriers. Other light rays are transmitted through the thin film 332. In the transmitted light, a light component having photon energy greater than 0.9 eV is absorbed by the thin film 333 and contributes to the generation of carriers.

With this configuration, light may be absorbed over a wide wavelength range of sunlight to improve conversion efficiency.

Advantageous Effects

Figure 15:
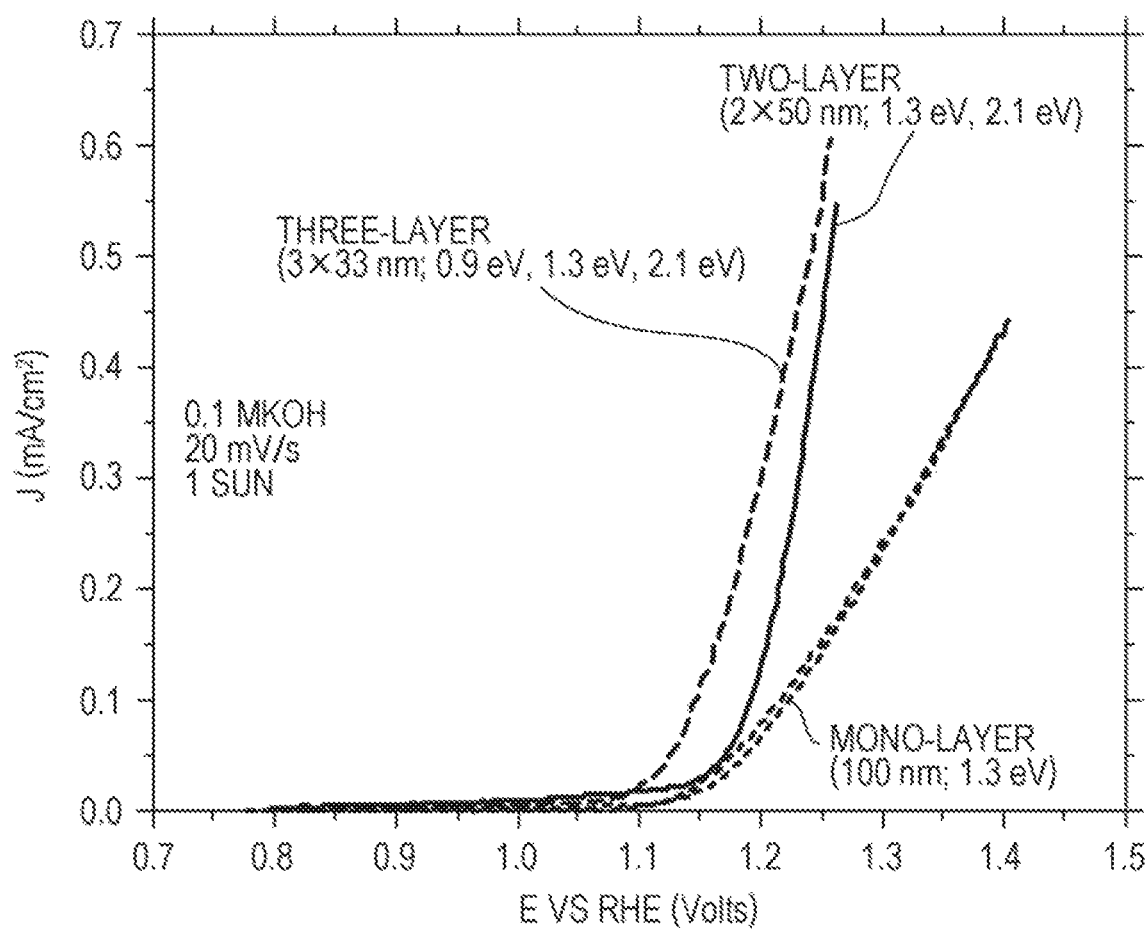
FIG. 15 is a graph illustrating an effect of an electrode configuration of the embodiment.

FIG. 15 is a graph illustrating an effect of the oxygen generating device using each oxygen generating electrode according to the first embodiment to the third embodiment. In the light-absorbing layer of each oxygen generating electrode, the film thicknesses are substantially the same, but the numbers of the thin films included are different. A horizontal axis is an RHE-based potential (Volts) and a vertical axis is current density (mA/cm$^2$). 0.1 M potassium hydroxide (KOH) is used as an electrolyte solution, a sweep rate is set to 20 mV/s, and a radiation dose is set to 1 SUN.

In a case of using the oxygen generating electrode 10 including the mono-layered light-absorbing layer having a thickness of 100 nm and a band gap of 1.3 eV in the first embodiment, current density may be increased by raising a potential to some extent. In the first embodiment, the band gap of the mono-layered light-absorbing layer may be designed to be a desired level by controlling an addition proportion of S without searching for an existing material having a target band gap.

In a case of using the light-absorbing layer having a two-layered structure (the thin film having a band gap of 1.3 eV and a thickness of 50 nm, and the thin film having a band gap of 2.1 eV and a thickness of 50 nm) of the second embodiment, current density dramatically rises at a certain potential and good conversion efficiency is exhibited.

In a case of using the light-absorbing layer of a three-layered structure (the thin film having a band gap of 0.9 eV and a thickness of 33 nm, the thin film having a band gap of 1.3 eV and a thickness of 33 nm, and the thin film having a band gap of 2.1 eV and a thickness of 33 nm) of the third embodiment, the rise in current density is slightly gentle compared to the second embodiment, but higher current density may be achieved at the same potential.

Hereinbefore, the present disclosure has been described based on the specific embodiments, but the present disclosure is not limited to the above examples. In a case where $BaSnS_xO_{3-x}$ is used for a light-absorbing layer, in order to design a band gap of 0.9 eV to 4.0 eV, x is designed in a range of 0<x<0.25, but the light-absorbing layer may be formed of $SrSnS_xO_{3-x}$. In this case, in order to achieve a band gap of the same range of 0.9 eV to 4.0 eV, x may be adjusted in a range of 0<x<0.3. As a light-absorbing layer, p-type $Sr_{1-y}K_ySnS_xO_{3-x}$ may be used. In this case, an addition proportion may be adjusted in a range of 0<y<0.05 and 0<x<0.3.

Regarding the number of perovskite-type thin films forming a light-absorbing layer, the layer may be formed of four or more thin films having different addition proportions of S from one another. Regarding sunlight, energy in one photon exhibits a strong spectrum in a range of 1.3 eV to 3.0 eV (visible range) and has a peak at 2.0 eV to 2.5 eV (green wavelength and the vicinity thereof). Although light energy in the visible range accounts for 50% or more of sunlight, infrared light with photon energy less than 1.3 eV or ultraviolet light with photon energy exceeding 3.0 eV is also usable for generation of oxygen/hydrogen, sunlight power generation, or the like.

According to the configuration of the present disclosure, by designing the band gap of each thin film included in the light-absorbing layer to be a desired value in a range of 0 to 4.0 eV, whole energy of sunlight is used and thus high conversion efficiency is achievable. For example, efficiency in oxygen generation and/or hydrogen generation may be improved by designing to have absorption sensitivity to sunlight over a whole range of 1.3 eV to 3.1 eV and to have an energy band structure suitable for an oxidation-reduction.

FIG. 16 is a schematic view of a photoelectric converter for converting photons to electricity. The major difference between a photoelectric converter 40B of FIG. 16 and an oxygen generating electrode 10B of FIG. 9 is a pair of a first wiring 70 and a second wiring 71. An electric current flows between the first wiring 70 and the second wiring 71 when the photocatalyst layer 14A receives photons from the sun and/or a light, for example. Accordingly, the photoelectric converter 400 for converting photons to electricity functions as a solar cell and a photodetector, etc.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus comprising:
   a conductive layer;
   a photocatalyst layer; and
   a light-absorbing layer arranged between the conductive layer and the photocatalyst layer, wherein the light-absorbing layer comprises a plurality of perovskite-type films,
   wherein each of the films contains tin (Sn), oxygen (O), sulfur (S), and one or more elements selected from Group 1 or Group 2 of the periodic table of elements,
   wherein each of the films is formed by substituting S into an O site,
   wherein a band gap of the light-absorbing layer is between 0 eV to 4 eV,
   wherein each of the films is formed of a same material, except an amount of sulfur (S) differs between each of the films.

2. The apparatus according to claim 1, wherein the plurality of films is arranged so that the amount of S increases in order from a side where light is incident.

3. The apparatus according to claim 1, wherein the one or more elements selected from Group 1 or Group 2 of the periodic table include Ba, Sr, and K.

4. The oxygen generating device according to claim 1, wherein a composition of a film of the light-absorbing layer is $BaSnS_xO_{3-x}$, wherein $0<x<25$.

5. The oxygen generating device according to claim 1, wherein a composition of a film of the light-absorbing layer is $SrSnS_xO_{3-x}$, wherein $0<x<25$.

6. The apparatus according to claim 1,
   wherein a composition of a film of the light-absorbing layer is $Ba_{1-y}K_ySnS_xO_{3-x}$, and $0<x<0.25$ and $0<y<0.05$ are satisfied.

7. The apparatus according to claim 1,
   wherein a composition of a film of the light-absorbing layer is $Ba_{1-y}K_ySrS_xO_{3-x}$, and $0<x<0.3$ and $0<y<0.05$ are satisfied.

8. The apparatus according to claim 1,
   wherein the conductive layer contains Sn and O, and is a degenerately doped perovskite-type layer.

9. The apparatus according to claim 8,
   wherein the conductive layer is an n-type conductive layer to which La is added.

10. The apparatus according to claim 1, further comprising:
    a substrate for supporting a stacked body of the conductive layer, the light-absorbing layer, and the photocatalyst layer,
    wherein the substrate is selected from $Ba_{1-z}La_zSnO_3$, $BaSn_{1-z}Sb_zO_3$, $Sr_{1-z}La_zSnO_3$, and $SrSn_{1-z}Sb_zO_3$.

11. An apparatus comprising:
    a first wiring,
    a second wiring,
    a conductive layer connected to the first wiring,
    a photocatalyst layer coupled to the second wiring, and a light-absorbing layer arranged between the conductive layer and the photocatalyst layer,
    wherein the light-absorbing layer is formed of a plurality of perovskite-type films,
    wherein each of the films contains tin (Sn), oxygen (O), sulfur (S), and one or more elements selected from Group 1 or Group 2 of the periodic table of elements,
    wherein each of the films is formed by substituting S into an O site,
    wherein a band gap of the light-absorbing layer is between 0 eV to 4 eV,
    wherein each of the films is formed of a same material, except an amount of sulfur (S) differs between each of the films.

12. An oxygen generating device comprising:
    an oxygen generating electrode including:
    a conductive layer,
    a photocatalyst layer,
    and a light-absorbing layer arranged between the conductive layer and the photocatalyst layer,
    wherein the light-absorbing layer is formed of a plurality of perovskite-type films,
    wherein each of the films contains tin (Sn), oxygen (O), sulfur (S), and one or more elements selected from Group 1 or Group 2 of the periodic table of elements,
    wherein each of the films is formed by substituting S into an O site,
    wherein a band gap of the light-absorbing layer is between 0 eV to 4 eV,
    wherein each of the films is formed of a same material, except an amount of sulfur (S) differs between each of the films,
    a counter electrode provided at a position facing the oxygen generating electrode;

and an electrolyte solution filled between the oxygen generating electrode and the counter electrode.

13. The oxygen generating device according to claim 12, wherein the plurality of films is arranged so that the amount of S increases in order from a side where light is incident.

14. The oxygen generating device according to claim 12, wherein the one or more elements selected from Group 1 or Group 2 of the periodic table of elements include Ba, Sr, and K.

15. The oxygen generating device according to claim 12, wherein a composition of a film of the light-absorbing layer is $BaSnS_xO_{3-x}$, wherein $0<x<25$.

16. The oxygen generating device according to claim 12, wherein a composition of the film of the light-absorbing layer is $SrSnS_xO_{3-x}$, wherein $0<x<30.7$.

17. The oxygen generating device according to claim 12, further comprising:
a substrate for supporting a stacked body of the conductive layer, the light-absorbing layer, and the photocatalyst layer,
wherein the substrate is selected from $Ba_{1-z}La_zSnO_3$, $BaSn_{1-z}Sb_zO_3$, $Sr_{1-z}La_zSnO_3$, and $SrSn_{1-z}Sb_zO_3$.

* * * * *